Aug. 9, 1932. L. S. HARBER ET AL 1,871,320
VARIABLE SPEED DRIVING OR TRANSMITTING GEAR
Filed July 23, 1928  4 Sheets-Sheet 1

INVENTORS
LAURENCE SEYMOUR BARBER
AND JOHN EDWARD POINTON
BY
ATTORNEY

INVENTORS
LAURENCE SEYMOUR HARBER
AND JOHN EDWARD POINTON
BY
ATTORNEY

INVENTORS
LAURENCE SEYMOUR HARBER
AND JOHN EDWARD POINTON
BY
ATTORNEY

Aug. 9, 1932.   L. S. HARBER ET AL   1,871,320
VARIABLE SPEED DRIVING OR TRANSMITTING GEAR
Filed July 23, 1928   4 Sheets-Sheet 4

INVENTORS
LAURENCE SEYMOUR HARBER
AND JOHN EDWARD POINTON
BY
ATTORNEY

Patented Aug. 9, 1932

1,871,320

UNITED STATES PATENT OFFICE

LAURENCE SEYMOUR HARBER AND JOHN EDWARD POINTON, OF PETERBOROUGH, ENGLAND, ASSIGNORS TO BAKER PERKINS COMPANY, INCORPORATED, OF NEW YORK, N. Y.

VARIABLE SPEED DRIVING OR TRANSMITTING GEAR

Application filed July 23, 1928, Serial No. 294,782, and in Great Britain August 9, 1927.

This invention relates to variable speed driving or transmitting gear for various services, and particularly for use with machines employed for such purposes as the mixing or other mechanical treatment of materials for the making of cakes, confectionery and the like.

The object of the invention is to provide for the ready setting of machines for operating at the required speeds and for the required periods to give a desired result, as for example, the production of a homogeneous mixture at a consistency suited for a given purpose.

The invention comprises the combination with variable speed driving or power transmitting elements, of means providing for the ready setting or adjustment of such mechanism to enable a machine to be run for a given period with a varying range of ratios between the driving and driven parts of said elements, followed if desired by a period of running at a fixed ratio, and the automatic stoppage of the machine at the conclusion of the required full period of running or operation.

Referring to the four accompanying sheets of explanatory drawings:

Figure 4 is a sectional elevation and Figure 5 is a plan showing a portion of the mechanism hereinafter referred to.

Like reference letters in the different views indicate like parts.

Figure 1:
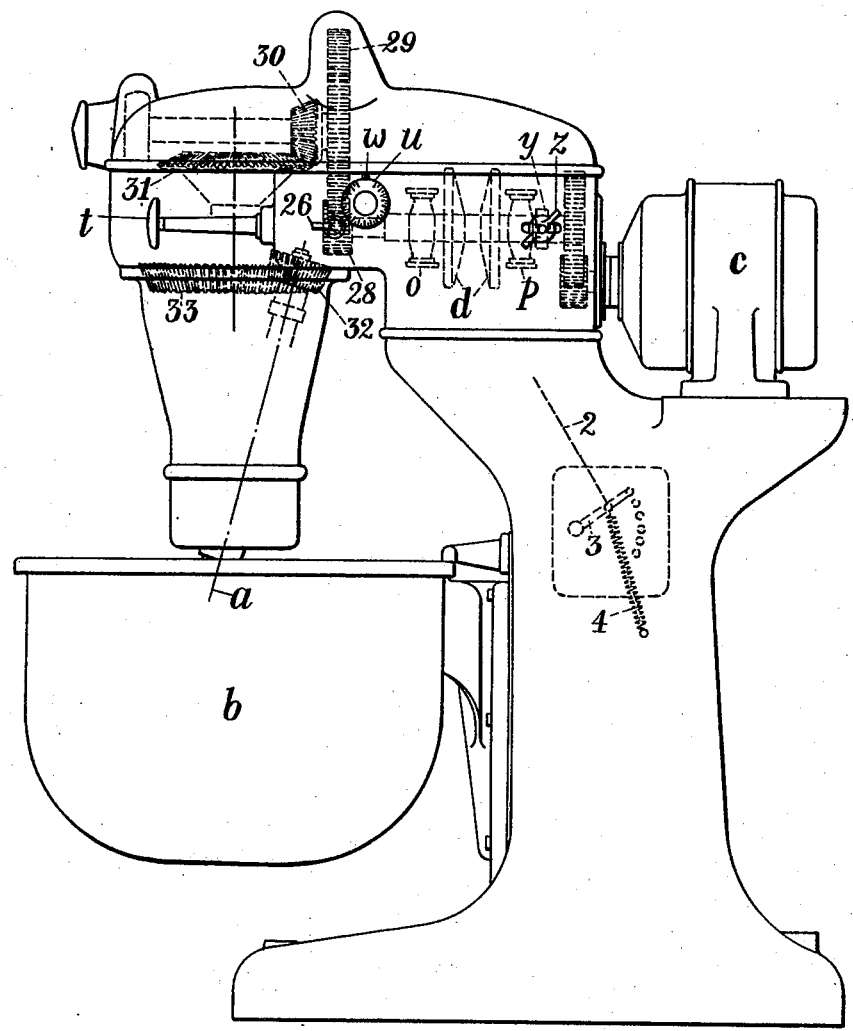
Figure 1 is an elevation representing sufficient of a dough mixing or like machine to illustrate the application of the invention thereto.
Figure 2:
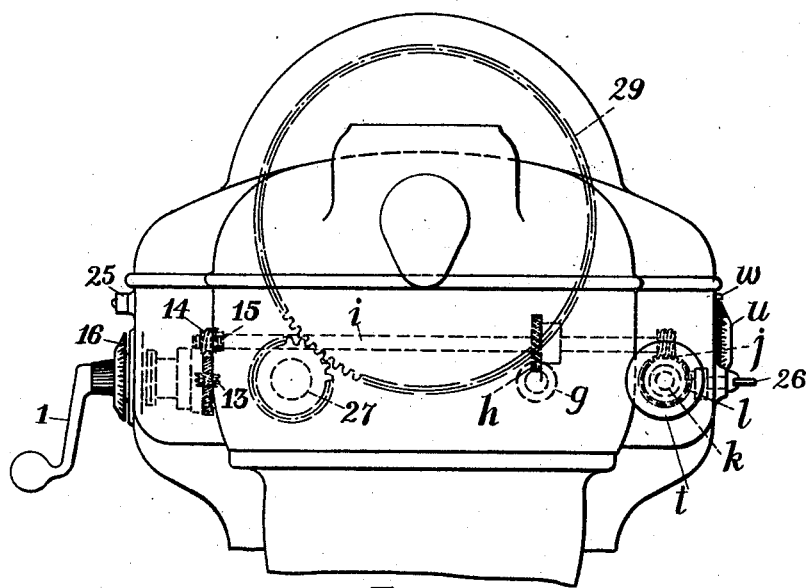
Figures 2 and 3 are end views (taken from opposite ends of the machine).
Figure 3:
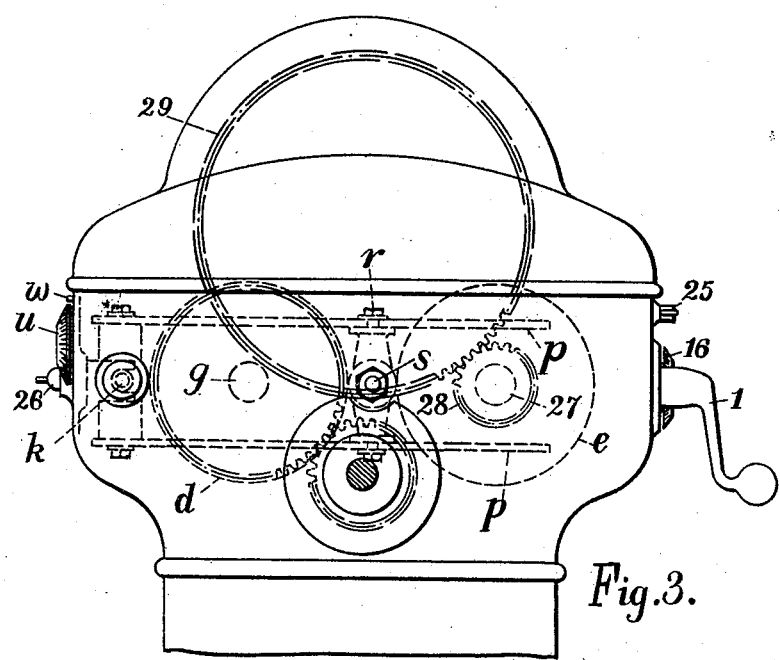
Figure 4:
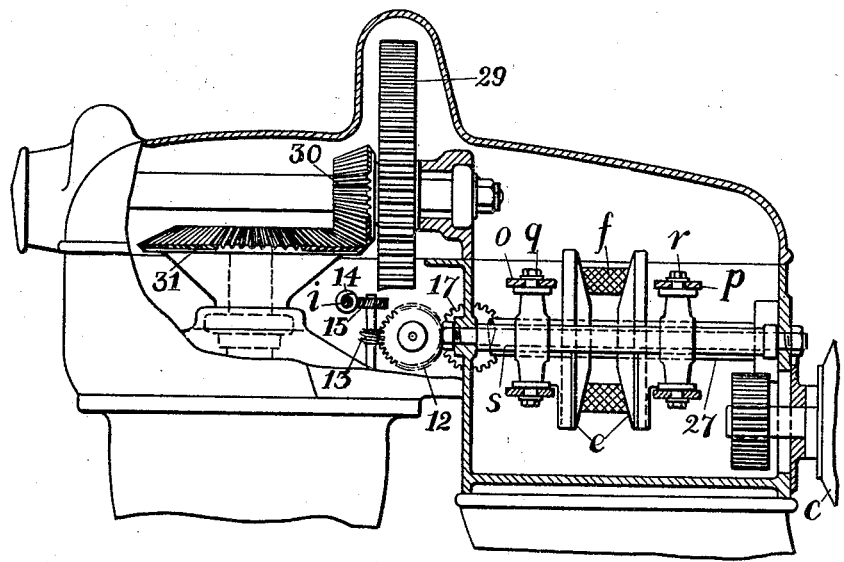

In one convenient application of the invention to a mixing or like machine as illustrated by the drawings, comprising a beater, whisk or its equivalent (indicated at Figure 1 by the centre line $a$) adapted to be rotated and otherwise moved in a pan or receptacle $b$ containing the materials, the driving power, preferably obtained through an electric motor $c$, is transmitted through gearing and a pair of adjustable cone pulleys $d$ and $e$, (each pulley being made up of a pair of discs having their adjacent faces coned), of which $d$ forms the driving and $e$ the driven pulley of the combination. The transmission from one pulley to the other is effected by any suitable belt or like connection as indicated at $f$ Figure 4.

The simultaneous adjustment of the effective diameters, or the belt engaging diameters of the said cone pulleys $d$ and $e$ (the one being increased and the other decreased) is obtained as follows:

One end of the shaft $g$ carrying the driving pulley $d$ is connected through a worm reduction gear $h$ with a lay shaft or spindle $i$ which is also connected through another worm reduction gear $j$ with a stem or rod $k$ having right and left hand screw threads thereon. A spring clutch $l$ is interposed between the worm wheel of the last named reduction gear $j$ and the said screwed rod $k$, permitting of a movement of the worm wheel relatively to the rod when required, as hereinafter described. The right and left hand threads of the stem or rod $k$ engage nuts as $m$ and $n$ forming part of or connected with arms or frames $o$ and $p$ which are pivoted at $q$, $r$ on a cross support $s$ so that on the rotation of the rod $k$ they receive a rocking motion which varies the distance between the discs forming the coned pulleys $d$ and $e$ aforesaid, causing the one pair of discs to approach and the other pair to recede from each other and thus altering the speed ratio between the driving pulley $d$ and the driven pulley $e$.

Figure 5:
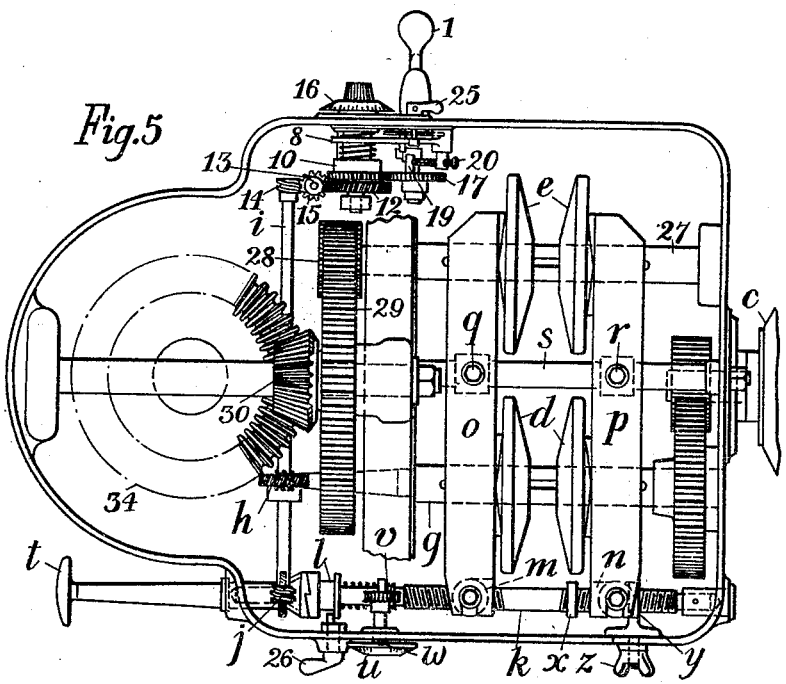

The said rocking arms or frames $o$ and $p$ are set to give the required starting speed ratio by the operation of a hand wheel $t$ fixed at one end of the rod or stem $k$. An appropriately graduated dial $u$ is geared or arranged in operative connection with the rod $k$ to facilitate such setting. Such a dial is shown at $u$, Figures 1 and 5. The rotation of the dial is automatically effected on the rotation of rod $k$ with which the dial is connected through worm gear train $v$ (Figure 5). A fixed index is placed above the dial as at $w$, Figure 1. Stops as $x$ and $y$ on the rod $k$ limit the movement of the arms $o$ and $p$ in each direction, the stop $y$ being adjustable by a sliding movement in a slot in the machine framing and fitted with a clamping nut $z$.

The automatic reduction or variation of the speed ratio between the driving and driven pulleys $d$ and $e$ begins with the starting of the machine, due to the movement imparted to the rocking arms $o$ and $p$ by the rotation of the screwed rod $k$ through the gears $h$ and $j$ aforesaid. Such variation continuously progresses until the movement of the rocking arms is arrested by the adjustable stop or abutment $y$. The transmission between the driving and driven pulleys can then continue, without further variation of the speed ratio between them, until the desired complete period of operation of the machine on the materials under treatment has been completed. Because of the aforesaid spring clutch connection $l$ interposed between the screwed stem or rod $k$ and the worm wheel of the gear $j$ through which it receives its rotary motion, no such motion will be imparted to the screwed rod during the running of the machine through the period of a fixed ratio between the driving and driven cone pulleys as the clutch will automatically slip or release when further movement of the rocking arms is prevented by the adjustable abutment $y$ aforesaid.

The machine is set to give the required full period of operation or treatment of a given mass of materials in the pan or receptacle $b$ as follows:

The electric motor $c$ is started by means of a handle 1 operating a flexible wire 2 and so pulling the starting switch lever 3 to the "on" position. The said switch lever 3 is indicated by dotted lines in Figure 1 with an end of the flexible wire 2 attached to it and also a spring 4 hereinafter referred to. On the starting handle shaft 5 is loosely mounted the drum or disc 6 on which one end of the flexible wire 2 is coiled, and such disc has a projection 7 therefrom engaged by a spring controlled lever or trigger 8 or like device to retain the switch lever 3 in the "on" position against the action of its spring 4. With the said trigger 8 there is arranged an adjustable release, preferably comprising a pin or peg 9 projecting from one member 10 of a clutch of which the other member 11 forms part of a worm wheel 12 driven from the aforesaid lay shaft $i$ through which the screwed rod $k$ is rotated. The gear between the said worm wheel 12 and lay shaft $i$ comprises worms 13 and 14 and worm wheel 15. The first named clutch member 10 has a suitably graduated setting or timing dial or knob 16 arranged therewith such that the said projecting pin or peg 9 may be set at the necessary position to effect the release of the trigger 8 at the required time after starting the machine and thus automatically stop the motor $c$.

Figure 6:
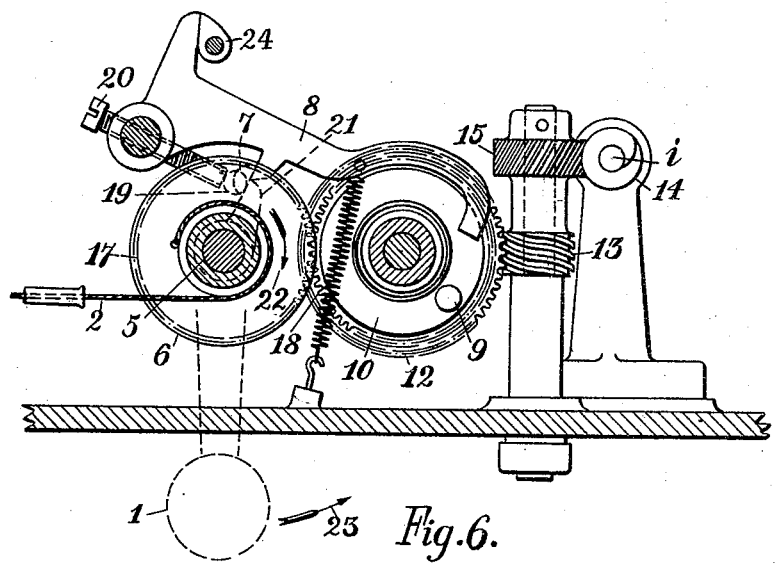
Figure 6 is a sectional elevation and Figure 7 a sectional plan showing, to a larger scale, details of the starting handle and timing mechanism associated therewith.
Figure 7:
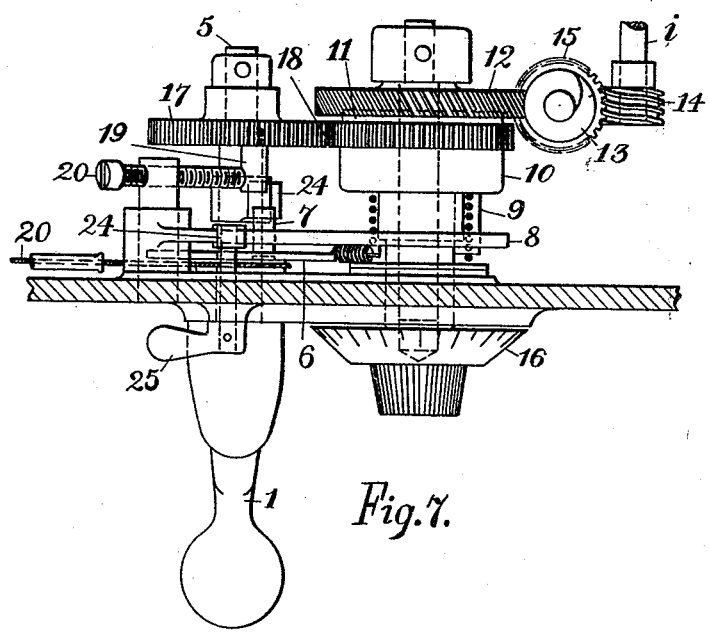

After the automatic stopping of the motor by the means aforesaid, the latter are automatically re-set at the starting position on the turning of the handle 1 for re-starting the motor $c$. For such re-setting a gear wheel 17 on the handle shaft or spindle 5 engages teeth 18 on the clutch member 10 carrying the trigger releasing peg 9. From the said gear wheel 17 there projects peg 19 which is in abutment with the adjustable stop 20 when the electric motor is started. The dog piece or projection 21 from the handle shaft abuts against the aforesaid projection 7 from the wire coiling disc or drum 6, the said part 21 also abuts against the said peg 19 from the wheel 17. At Figures 6 and 7 the parts are shown in the positions taken up when the motor has been just started or re-started. During the running of the motor the peg 19 and the dog 21 will move away in the direction of the arrow 22 from the positions shown at Figures 6 at the same rate that the peg 9 approaches the trigger 8. When, after the tripping of the trigger by the peg 9 as aforesaid for stopping the motor, the latter is re-started by a movement of the handle 1 in the direction of the arrow 23 (Figure 6), the dog or projection 21 of the handle shaft in moving the winding disc or drum 6 will also move back the peg 19 to the adjustable abutment 20 and in so doing will automatically reset the mechanism to the starting position.

For an emergency stoppage of the motor (independently of the automatic stop aforesaid) the trigger 8 may be released by hand through cam 24 (Figures 6 and 7) operated by handle 25 (Figure 5), with the consequent stopping of the motor (by the action of spring 4 Figure 1) at any moment during the run of the machine.

A mixing machine having this invention applied thereto may be readily set to meet varying conditions. Thus, for example, for a full run or period of operation extending over say twenty minutes, the machine may be set to start with a beater speed at the rate of say twelve revolutions per minute gradually slowing down in say three minutes to a rate of eight revolutions per minute and continuing uniformly at the latter rate throughout the remaining seventeen minutes of the run. Other speeds and times may be obtained by the mere setting of the change dial $u$ by a movement of the hand wheel $t$ of the screwed rod $k$, and the adjustable abutment $y$, and the timing dial 16 as aforesaid, to the desired figures or graduations of such parts.

The automatic progressive reduction of the speed ratio between the driving and driven pulleys $d$ and $e$ by the movement imparted as aforesaid to the rocking arms $o$ and $p$, may be prevented if desired by disconnecting the clutch $l$ on the screwed rod $k$ by means of the hand operated lever 26. The beater or operative element $a$ of the machine can then be rotated at a uniform speed if so required throughout the period between the starting and stopping of the machine.

The transmission between the shaft 27 (carrying the driven pulley $e$) and the operative element $a$ of the machine may be effected through any ordinary gear, as for example, the wheels 28, 29, 30, 31, 32 and 33.

The mechanism employed in the application of the invention may be modified in various ways to meet varying services or requirements.

Having thus described our invention what we claim as new and desire to secure by Letters Patent is:

1. In combination with a machine having a driving motor and a switch in circuit therewith, a starting handle shaft, a winding drum freely rotatable on said shaft, a cable connecting said drum and switch, a spring associated with said switch to hold it normally open, a rotatable indicator member, a friction clutch member integral therewith, a lay spindle operatively connected to said motor, a second clutch member arranged to cooperate with the first-mentioned clutch member and having a wheel geared to said lay spindle, a releasing peg mounted on said first-mentioned member of the friction clutch, a spring-controlled trigger situated in the path of movement of said peg, said trigger arranged for releasable engagement with said cable winding drum, a resetting dog and a resetting gear fixed to the starting handle shaft, a stop carried by said resetting gear, an adjustable abutment mounted on a fixed support and projecting into the path of said peg stop, and to a co-acting gear integral with the first-mentioned clutch member, for the purposes set forth.

2. The combination of a machine, a driving motor therefor, a lay spindle operatively connected to said motor, a switch controlling a power circuit to said motor, a rotatable drum, a cable operatively connecting said drum and switch for closing the switch, a spring connected to said switch for holding it normally open, a starting handle and a dog operated thereby to rotate the drum and wind the cable, a trigger releasably holding the drum, a trigger releasing peg, means including a friction clutch driven by said lay shaft for revolving the peg to displace the trigger, and resetting devices actuated by said handle, independently of the operation of the lay shaft, for restoring said peg to its initial position.

In testimony whereof we have signed our names to this specification.

LAURENCE SEYMOUR HARBER.
JOHN EDWARD POINTON.